United States Patent
Wiles et al.

(10) Patent No.: US 7,398,186 B2
(45) Date of Patent: Jul. 8, 2008

(54) DATA ACQUISITION SYSTEM FOR SYSTEM MONITORING

(75) Inventors: Jeffrey L. Wiles, Southgate, KY (US); Victor M. Ivers, Amelia, OH (US); Sarah A. Cox, Carmel, IN (US); Larry D. O'Cull, Westfield, IN (US)

(73) Assignee: Xtek, Inc., Cincinnati, OH (US)

( * ) Notice: Subject to any disclaimer, the term of this patent is extended or adjusted under 35 U.S.C. 154(b) by 0 days.

(21) Appl. No.: 11/622,852

(22) Filed: Jan. 12, 2007

(65) Prior Publication Data
US 2007/0174022 A1 Jul. 26, 2007

Related U.S. Application Data

(63) Continuation-in-part of application No. 11/205,985, filed on Aug. 17, 2005, now Pat. No. 7,328,130.

(51) Int. Cl.
*G06F 11/30* (2006.01)
*G21C 17/00* (2006.01)

(52) U.S. Cl. ...................................... 702/183

(58) Field of Classification Search .................. 702/35, 702/36, 44, 182–185, 187–189; 73/660, 73/661
See application file for complete search history.

(56) References Cited

U.S. PATENT DOCUMENTS

| | | | |
|---|---|---|---|
| 5,507,372 A * | 4/1996 | Boardman et al. | 192/3.31 |
| 5,864,781 A * | 1/1999 | White | 702/182 |
| 6,233,527 B1 | 5/2001 | Franke et al. | |
| 6,687,592 B2 | 2/2004 | Grob et al. | |
| 6,947,813 B2 | 9/2005 | Sugihara et al. | |
| 6,496,120 B1 | 12/2007 | Devulapalli et al. | |
| 7,328,130 B2 * | 2/2008 | Wiles et al. | 702/183 |
| 2003/0120402 A1 | 6/2003 | Jaw | |
| 2003/0130810 A1 | 7/2003 | Smulders et al. | |
| 2005/0119840 A1 | 6/2005 | Astley et al. | |
| 2005/0125183 A1 | 6/2005 | Lindberg et al. | |
| 2006/0016201 A1 | 1/2006 | Kopel | |
| 2006/0178854 A1 | 8/2006 | Lindsay et al. | |
| 2007/0043533 A1 * | 2/2007 | Wiles et al. | 702/183 |
| 2007/0225944 A1 * | 9/2007 | Knutsen | 702/187 |

OTHER PUBLICATIONS

Lee, Jay, et al., :"*Tether-free Technologies for e-Manufacturing, e-Maintenance & e-Service*", University of Wisconsin-Milwaukee and University of Michigan; Oct. 1-2, 2001; pp. 1-29.

(Continued)

*Primary Examiner*—Michael P Nghiem
(74) *Attorney, Agent, or Firm*—Thompson Hine LLP

(57) ABSTRACT

A method and monitoring system for tracking operational parameters of a drive train of a monitored system includes a sensor unit affixed to the drive train. The sensor unit includes a sensor for generating an analog signal in response to an operating condition of the monitored system and an integrated local processor for processing the analog signal generated by the sensor. Actions of a sensor unit associated that is mounted from movement of a component of the drive system may be initiated via wireless receipt of instructions from another processing unit.

9 Claims, 12 Drawing Sheets

OTHER PUBLICATIONS

"*Reaping the Rewards of a Remote Monitoring and Diagnostics Program*"; Rockwell Automation; Publication No. GMSC01-WPoo3-EN-P; Nov. 2003; 8 pgs.

"*Vibronet® Signalmaster—'Plug & Go' Online Monitoring*"; www.pruftechnik.com; PRÜFTECHNIK; Germany, 2002, 3 pgs.

"*Vibroweb® XP—Diagnostic Monitoring; Prüftechnik Condition Monitoring*"; Jul. 2004, 2 pgs.

"*Vibroweb®-Online Monitoring—smart & flexible; Using Internet Technology*"; www.pruftechnik.com; PRÜFTECHNIK; Germany; 2004; 6 pgs.

"*Introducing the world of Web-Based Condition Monitoring*"; www.motornostix.com; at least by Mar. 19, 2004; 4 pgs.

Tapson, Jon, Assoc. Prof.; "*Canary in a Coal Mine: The Development of a Web-based Online Condition Monitoring System*"; at least by Mar. 19, 2004, 7 pgs; University of Cape Town, South Africa; www.motornostix.com.

"*Application Note 5*"; pp. 1-6; MX-MKT0115-01; www.motornostix.com; at least by Mar. 19, 2004.

* cited by examiner

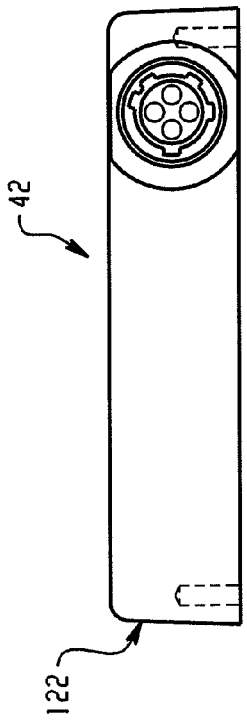
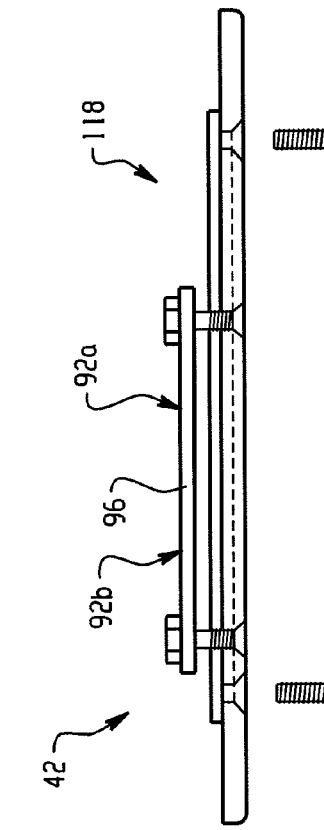
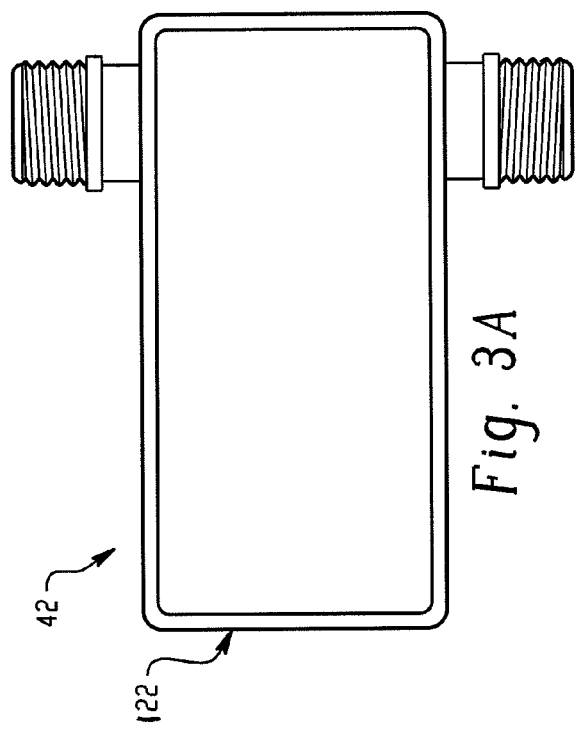
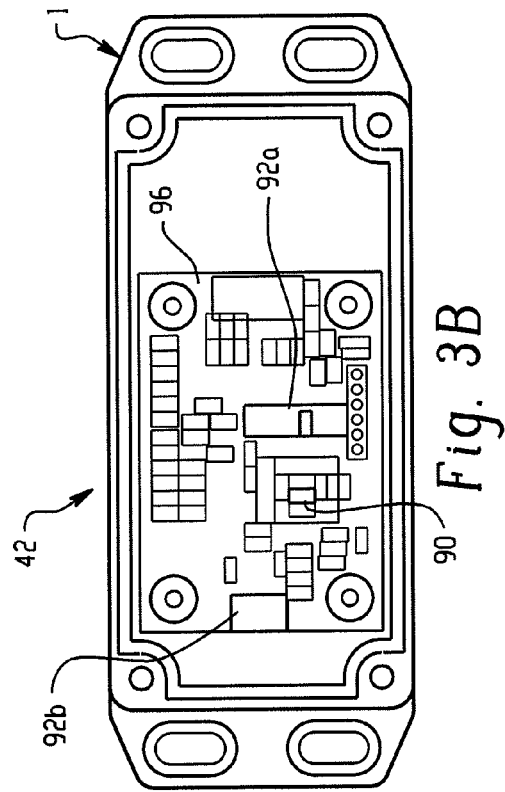

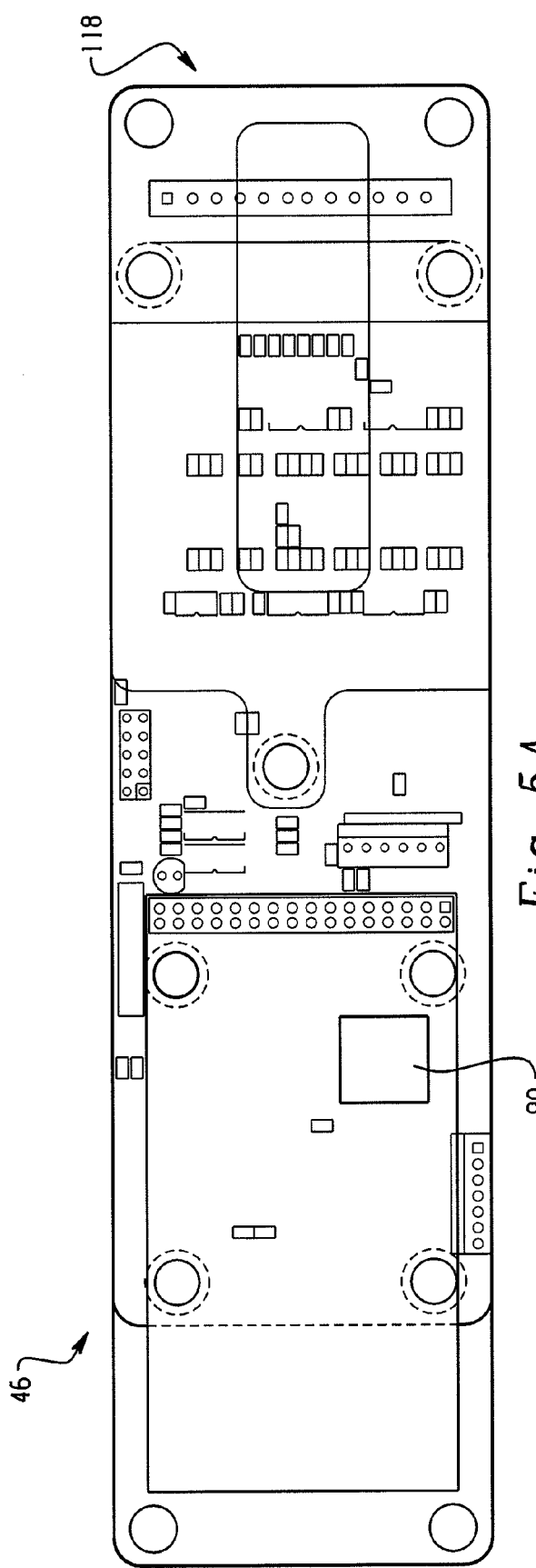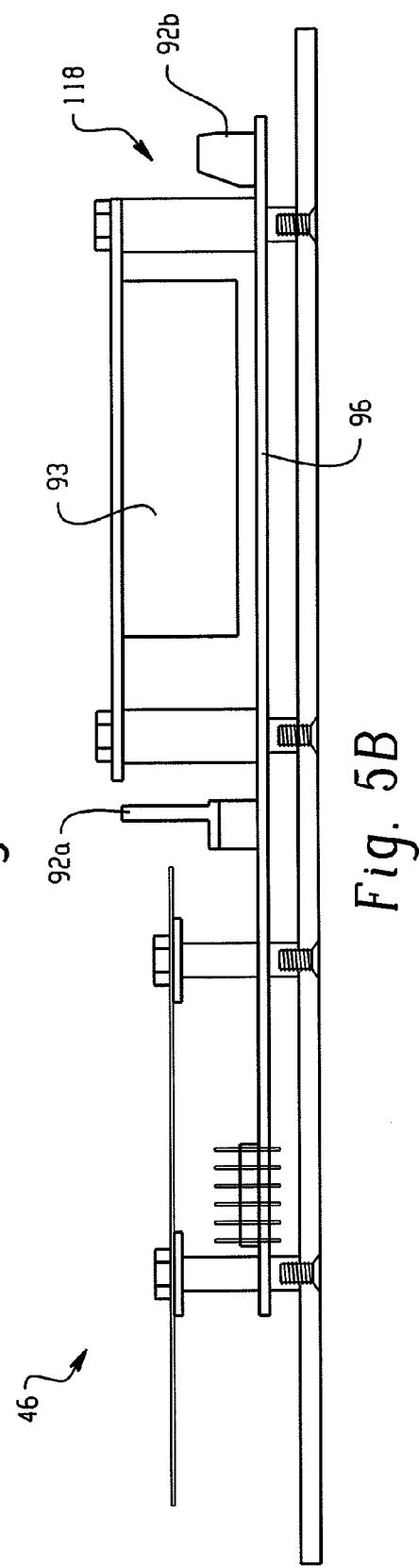
Fig. 5A
Fig. 5B

DATA ACQUISITION SYSTEM FOR SYSTEM MONITORING

CROSS-REFERENCE

This application is a continuation-in-part of application Ser. No. 11/205,985, filed Aug. 17, 2005 now U.S. Pat. No. 7,328,130.

TECHNICAL FIELD

The present application relates generally to data acquisition systems and more particularly to a data acquisition system for system monitoring.

BACKGROUND

Machines are often monitored to detect and measure certain operating conditions. For example, it may be desirable to monitor vibrations or oscillations in machines having moving parts. As another example, it may be desirable to measure load, such as torque, in a machine used to rotate a shaft. Sometimes, a machine, itself, may provide some capability of monitoring an operating condition, such as revolutions per minute (RPM) of a rotating shaft, as an example. However, in many cases, the machine does not have the capability to provide data relevant to at least some of the operating characteristics that an operator may want to track.

Monitoring systems have been proposed that can perform desired measuring tasks. As one example, a system has been proposed that includes a transportable, hand-held measuring apparatus. The measuring apparatus is connected by a transmission cable to a point on a machine that is excited by oscillations and the measuring apparatus is used to measure operating conditions at that point. A central computer is used to process the measured data from the measuring apparatus. The central computer also stores the data collected by the measuring apparatus.

Such a hand-held measuring apparatus can measure a condition at a location on the machine, providing a "snap shot" of the operating conditions at a specific point and moment in time the data is acquired. There is a need for a monitoring system capable of monitoring a number of a machine's operating parameters simultaneously.

SUMMARY

In some aspects, a method and monitoring system for tracking operational parameters of a monitored system including a member driven by a drive motor operatively coupled with the member via a drive arrangement including a geared coupling are provided. A sensor unit is provided on one of the drive motor and the geared coupling. The sensor unit includes a sensor for generating an analog signal in response to an operating condition of the monitored system and an integrated local processor for processing the analog signal generated by the sensor. The integrated local processor has an associated timer for processing the analog signal generated by the sensor to (i) produce a first plurality of digital signal samples and (ii) package the first plurality of digital signal samples together as a packet for transmission. The packet includes an associated timestamp value for a digital signal sample of the plurality of digital signal samples and an associated reporting rate value from which a relative timing of the other digital signal samples can be determined.

In another aspect, a method of tracking operational parameters of a drive system including first and second members driven respectively by first and second coupling shafts is provided. The method involves: providing a first sensor unit on the first coupling shaft, the first sensor unit adapted for wireless communication with a remote processing unit, the first sensor unit including an integrated local processor and local memory; providing a second sensor unit on the second coupling shaft, the second sensor unit adapted for wireless communication with the remote processing unit, the second sensor unit including an integrated local processor and local memory; the first sensor unit operating to acquire and store sensor data in its local memory until the first sensor unit receives a data transmit trigger from the remote processing unit; the second sensor unit operating to acquire and store sensor data in its local memory until the second sensor unit receives a data transmit trigger from the remote processing unit; sending a transmit trigger wirelessly from the remote processing unit to the first sensor unit, the first sensor unit responsively wirelessly transmits sensor data to the remote processing unit; sending a transmit trigger wirelessly from the remote processing unit to the second sensor unit, the second sensor unit responsively wirelessly transmits sensor data to the remote processing unit; wherein the sending of the transmit trigger to the second sensor unit is offset in time from the sending of the transmit trigger to the first sensor unit so as to assure that transmission of sensor data from the first sensor unit to the remote processing unit is completed before transmission of sensor data from the second sensor unit to the remote processing unit takes place.

In a further aspect, a method of tracking operational parameters of a drive system is provided. The method involves: providing a first sensor unit on a first component of the drive system, the first sensor unit including an integrated local processor; providing a second sensor unit on a second component of the drive system, the second sensor unit including an integrated local processor; detecting working condition of the drive system; responsive to detection of the working condition, sending a data acquire instruction to the first sensor unit, and sending a data acquire instruction to the second sensor unit, causing both the first and second sensor units to acquire sensor data during a common time period that overlaps with the drive system operating in the working condition.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

FIG. 3A is a top view of an embodiment of a portion of a sensor unit enclosure;

FIG. 3B is a plan view of an embodiment of a sensor unit with the portion of FIG. 3A removed;

FIG. 3C is a side view of the portion of FIG. 3A;

FIG. 3D is a side view of the sensor unit of FIG. 3B with the portion of FIG. 3A removed;

FIG. 5A is a plan view of another embodiment of a sensor unit showing a printed circuit board;

FIG. 5B is a side view of the sensor unit of FIG. 5A;

DETAILED DESCRIPTION

For purposes of describing an embodiment, this description will focus on monitoring of a rolling mill power transmission drive train. However, this embodiment is exemplary and is in no way intended as a limitation, as other drive train and machine types may be monitored. Other machines and equipment that may be monitored include, for example, overhead crane gear drives, process machinery such as slitters, levelers and shear drives that incorporate power transmission, and other transmission drive applications where monitoring of operational conditions may be desirable.

Figure 1:
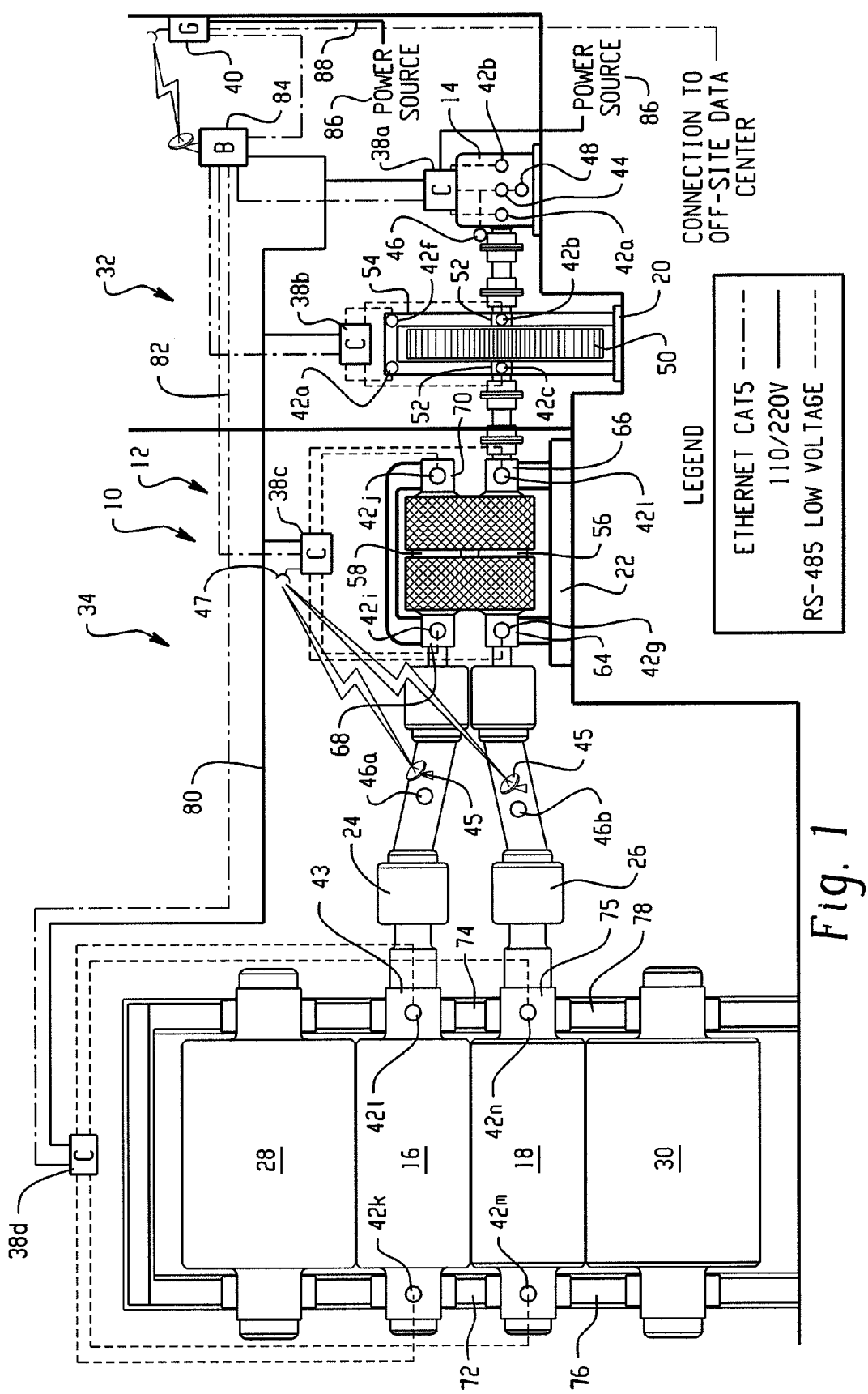
FIG. 1 is a diagrammatic view of an embodiment of a method and apparatus for monitoring a machine using a monitoring system.

Referring to FIG. 1, a rolling mill drive train 10, e.g., for use in rolling metal such as steel is shown with a monitoring system 12 connected thereto. Rolling mill drive train 10 includes a motor 14 that is operatively connected to work rolls 16 and 18 through a drive train power transmission that includes a gear reducer 20, pinion assembly 22 and couplings shown as shaft couplings 24 and 26. Backup rolls 28 and 30 are located adjacent work rolls 16 and 18 to form a gap or nip through which a work piece (e.g., a metal plate) can pass during a rolling operation. The motor 14 and gear reducer 20 are located in a motor room portion 32 of a mill, while the pinion assembly 22, shaft couplings 24, 26, work rolls 16, 18 and backup rolls 28, 30 are located in a mill portion 34 separated from the motor room portion 32.

In the illustrated example, monitoring system 12 is used to monitor and evaluate operating conditions, such as vibration, temperature, torque, current, speed, rotational position, etc., of rolling mill drive train components. Monitoring system 12 includes a number of sensor units generally designated as 42, 44 and 46 that are affixed locally to (i.e., at or close to) various drive train power transmission components, such as those described above. By affixing the sensor units 42, 44 and 46 locally to a number of components of the drive train power transmission, relative comparisons of the operating conditions of the components can be made using data generated by the sensor units, which, in some instances, may provide for a more reliable analysis of the operating conditions of the rolling mill drive train 10. As will be described in greater detail below, the sensor units 42, 44, 46 include both a sensor and a microprocessor that send data to associated communicators generally designated as 38 (sometimes referred to as a hub or a collector) which gather the data. The gathered data is then sent to a gateway 40 (e.g., a server) that is connected to a remote server system (not shown), for example, via the Internet.

Referring still to FIG. 1, motor 14 includes sensor units 42a, 42b and 44 operatively affixed thereto with sensor unit 44 also connected to a proximity sensor 46 and a current transformer 48. More particularly, sensor unit 42a is affixed to a bearing housing (not shown) of the motor 14 and is used to monitor vibration at the bearing housing. Affixed to an opposite bearing housing (not shown) of the motor 14 is sensor unit 42b, which is also used to monitor vibration at the opposite bearing housing. Sensor unit 44 is affixed to a base of the motor 14 and is also connected to external sensor inputs, e.g., as shown, proximity sensor 46 and current transformer 48. Proximity sensor 46 may be used to measure shaft speed of the motor 14, in some embodiments, by measuring rotational pulses. Current transformer 48 provides a signal output representing the current wave form supplied to the motor 14. Sensor unit 44 can collect data using the signals supplied by the proximity sensor 46 and current transformer 48 to monitor motor operation.

Gear reducer 20 includes four sensor units 42c, 42d, 42e, 42f. Sensor units 42c and 42d are affixed to a bearing housing 52 of a drive shaft of output gear 50 and are used to monitor vibration and temperature at the bearing housing 52. Sensor units 42e and 42f are affixed to a bearing housing of an input drive shaft of input pinion gear 54 and are used to monitor vibration and temperature at the bearing housing of the gear 54.

Pinion assembly 22 includes four sensor units 42g, 42h, 42i, 42j, each affixed at an associated bearing housing 64, 66, 68, 70. Sensor units 42g and 42h are affixed to bearing housing 64 and 66 of pinion shaft 56. Sensor units 42i and 42j are affixed to bearing housing 68 and 70 of pinion shaft 58. Each sensor unit 42g, 42h, 42i, 42j is used to monitor vibration and temperature at its respective bearing housings 64, 66, 68, 70.

Each shaft coupling 24 and 26 includes a respective sensor unit 46a, 46b affixed thereto that rotates with the shaft coupling. Sensor units 46a and 46b are used to monitor vibration, torque, temperature and shaft position of their respective shaft couplings 24 and 26. In some sensor unit 46a and 46b embodiments including a battery, the sensor units 46a and 46b are used to monitor battery voltage for an indication of battery power level and need for battery replacement and/or recharging.

Work rolls 16, 18 include associated pairs of sensor units 42k and 42l, 42m and 42n affixed thereto. Sensor units 42k and 42l are affixed at respective bearings 72 and 74 of work roll shaft 43 while sensor units 42m and 42n are affixed at respective bearings 76 and 78 of work roll shaft 75. Each sensor unit 42k-42n is used to monitor vibration and temperature at its respective bearing location.

Any suitable method can be employed to operatively mount the sensor units 42, 44, 46 to the machine drive train 10. In some embodiments, the sensor units 42, 44 and 46 are fastened to the machine drive train 10 with fasteners, such as screws, bolts, etc. for a permanent installation. Other mounting methods are possible, such as by welding.

As represented by FIG. 1, each sensor unit 42, 44, 46 is capable of communicating with a communicator 38a, 38b, 38c, 38d (e.g., through a RS 485, 4-wire connection and/or a wireless connection such as by RF transmission), with sensor units 42a, 42b and 44 connected to communicator 38a, sensor units 42c-42f connected to communicator 38b, sensor units 42g-42j and sensor units 46a and 46b connected to communicator 38c and sensor units 42k-42n connected to communicator 38d. Sensor units 46a and 46b communicate wirelessly (e.g., using an RF transmitter 45) with communicator 38c (e.g., using a RF receiver including an omni-directional RF antennae 47), while the other sensor units 42a-42n and 44 communicate with their respective communicators 38a-38d via a wired connection. Use of an omni-directional RF antennae may reduce communication interruptions between sensor units 46a, 46b and the communicator 38c due to rotation of the sensor units 46a and 46b with the shaft couplings 24 and 26. Other configurations are possible whereby one or more of sensor units 42a-42n, 44 communicate wirelessly. In some embodiments, none of the sensor units may communicate wirelessly. For example, each of the sensor units 42a-42n, 46a, 46b and 44 may be connected to a communicator via a wired connection. Communicators 38a-38d supply power (e.g., DC low voltage, such as 8-28 VDC) to associated sensor units 42a-42n and 44 through the wire connections. Sensor units 46a and 46b each include an internal power supply (e.g., a battery) providing power thereto. Each of the communicators 38b-38d are connected (as shown by lines 80) to a power source 86 (e.g., a 110/220V AC source) through communicator 38a.

Communicators 38 gather data received from the sensor units 42, 44, 46 and send data to the gateway 40. Gateway 40 acts as a local server to host communications from each communicator 38 and can provide Internet connectivity to an off-site system host via a local network connection (e.g., a LAN connection) illustrated by dotted lines 82 and bridge component 84. Gateway 40 is connected to a power source 86 via line 88.

Figure 2:
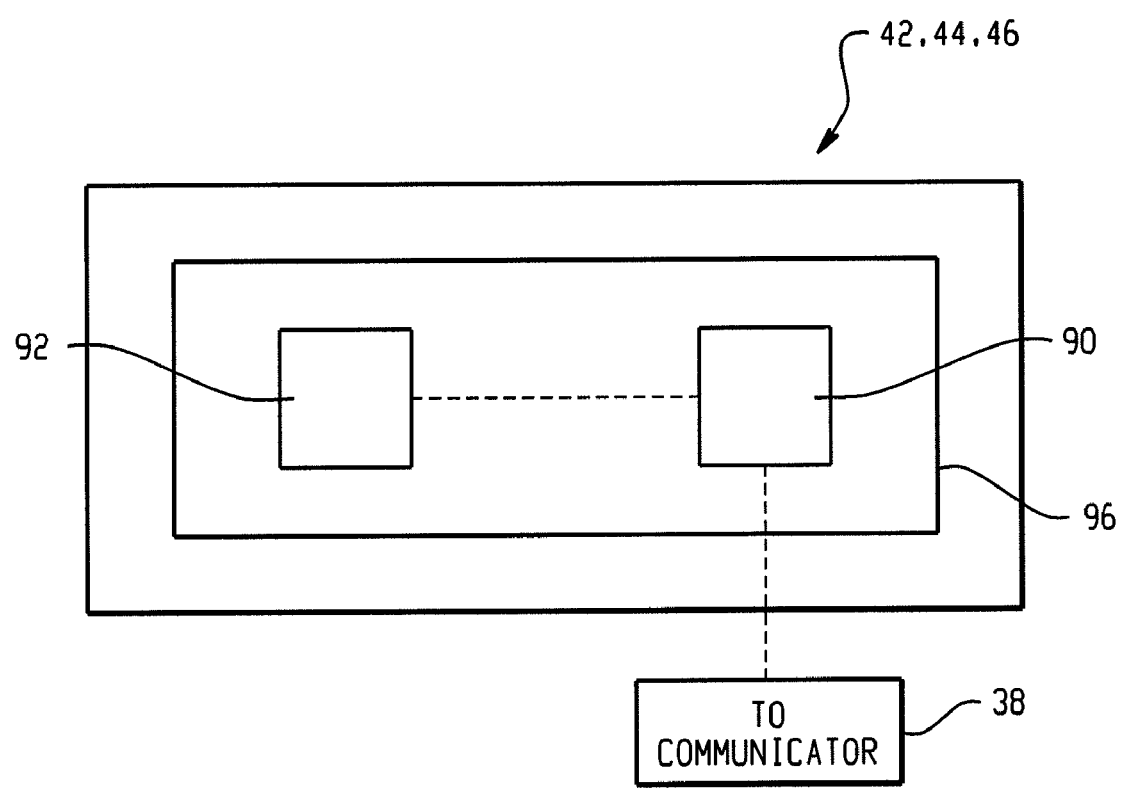
FIG. 2 is a diagrammatic view of an embodiment of a sensor unit for use in the monitoring system of FIG. 1.

Referring to the diagrammatic illustration of FIG. 2, the sensor units 42, 44 and 46 may include a sensor 92 (e.g., an accelerometer) or a set of sensors and an integral local microprocessor 90 as part of the same unit. In some embodiments such as the one shown, both the microprocessor 90 and the sensor 92 electronics reside on the same circuit board 96. In other embodiments, the microprocessor 90 electronics may reside in the same module, but separated from the board 96 carrying the sensor 92 electronics.

As noted above, sensor units 42 and 46 acquire specific operational data for determining, for example, vibration, temperature, torque/strain, electric current, rotational speed and/or rotational position through the use of sensors 92, which are responsive to the machine's operating conditions. Additional physical data acquisition is possible utilizing sensor unit 44, which may include standard voltage or current output sensors.

FIGS. 3A-3D show an embodiment of sensor unit 42 that includes sensor 92a responsive to three axes of vibration and sensor 92b responsive to temperature or, in some embodiments, strain. Sensor 92a may be carried by circuit board 96 which also carries microprocessor 90, while sensor 92b includes an input for a connection with a remote temperature detector. In some embodiments, sensor 92a may be included separate from the circuit board 96 carrying the microprocessor 90. In some instances, sensor unit 42 may not include a temperature and/or stain sensor 92b.

Figures 4A, 4B:
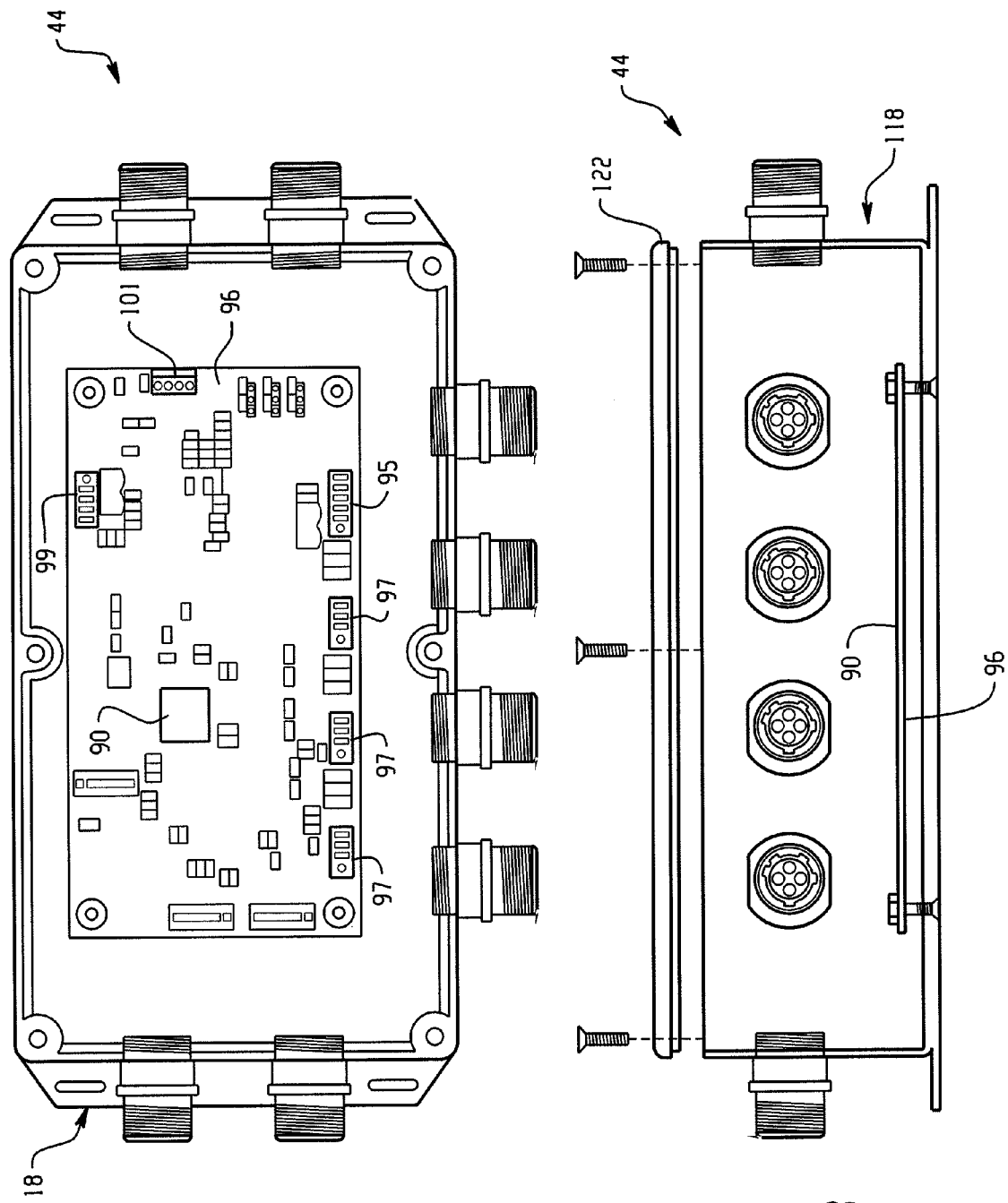
FIG. 4A is a plan view of an embodiment of a sensor unit showing a printed circuit board.
FIG. 4B is a side, partially exploded view of the sensor unit of FIG. 4A.

Referring to FIGS. 4A and 4B, sensor unit 44 includes three ±10 volt inputs 95, three 4-20 mA current inputs 97, optical encoder inputs 99 and a proximity switch input 101. Sensor unit 44 may also include a temperature sensor 92b and a power supply, such as a battery.

Referring to FIGS. 5A and 5B, sensor units 46 are wireless and are capable of being attached to a rotating shaft. Sensor unit 46 includes a one axis vibration sensor 92a and three temperature and/or strain sensors 92b. As shown, each of the sensors 92a and 92b are included on the same circuit board 96 as microprocessor 90. A power supply 93 provides power to the sensor unit 46. In some embodiments, sensor unit 46 includes a sensor 92b that is separate from the circuit board 96 carrying the microprocessor 90.

Referring now to FIGS. 3A-5B, the sensor 92 and microprocessor 90 are housed within an enclosure, in some embodiments, formed by a base portion 118 that can be mounted to the respective drive train 10 component and a cover portion 122 that can be connected to the base portion. In some embodiments, the cover portion 122 and base portion 118 when connected together form a seal (e.g., a water-tight seal).

The microprocessors 90 can receive information or data from the sensors 92, for example, in the form of electric analog signals in order to pre-process the data prior to sending the data to the communicator 38 (FIG. 1). The microprocessor 90 may include an integral timer, read-only memory, flash memory, serial communications and/or an analog-to-digital (A/D) converter (in some embodiments, an 8 channel, 10 bit A/D converter). Analog signals are sent from sensors 92 (in some embodiments, continuously) and captured by microprocessor 90. Microprocessor 90 converts the analog signal to digital data in the sensor unit 42, 44, 46. The microprocessor 90 measures the analog signal level at predetermined intervals of time (sometimes referred to as sampling) and converts the analog signal to an integer value (sometimes referred to as a count) between, for example, 0 and 1023. Microprocessor may sample the analog signal at a rate of about 8,000 Hz or more as an example. The integer value can later be converted to a "real" value (e.g., at an off-site host processor) using a transformation formula dependent on the type of measurement and sensor unit. For example, in one embodiment, data received from an off-board temperature sensor 92b, e.g., of the sensor unit of FIG. 3A may be converted from a digital count to a temperature value using $$\text{Temp}(F) = -0.457478(\text{count}) + 500.0.$$

It should be appreciated from the foregoing that numerous digital data records can be generated by the sensor units 42, 44, 46 with each record relating to an operating condition of an associated machine component. To manage data record volume, the microprocessors 90 may have a respective reporting rate where the microprocessors select predetermined ones of the digital data values output by the A/D converter to report and further process. In these embodiments, the reporting rate (e.g., 100 Hz, 1000 Hz, etc.) may be less than the sampling rate (e.g., 8000 Hz). This can reduce the amount of data processing by reducing the amount of records to be processed, while providing for continuous data acquisition using the microprocessors 90. Advantageously, this can provide flexibility in increasing or decreasing the reporting rate of the sensor unit 42, 44, 46 without any need to change sensor 92 output or sampling rate of the microprocessor 90.

Microprocessors 90 of the sensor units 42, 44, 46 mark at least some or all of the digital values output by the A/D converter to facilitate downstream processing and analysis. To illustrate, each microprocessor 90 may timestamp digital data values at each sensor unit 42, 44, 46, for example, with a 32-bit integer at the designated reporting rate. The timestamp can begin at zero and can be incremented at predetermined intervals, such as every $\frac{1}{125}$th of a second (e.g., corresponding to the sampling rate) or less, as an example. In some implementations, all of the sensor units 42, 44, 46 of the monitoring system 12 are initiated or reset substantially simultaneously (in some embodiments, upon user command or automatically) such that the timestamps of all of the sensor units begin at the same value at substantially the same instance in time (e.g., within about ±0.5 millisecond of each other). In some instances, the timestamp of each microprocessor 90 rolls over back to zero, e.g., once the integer reaches its maximum value. The timestamp can be transmitted with the digitized data from the sensor units 42, 44, 46 to the communicators 38 and be used during downstream processing for, e.g., data synchronization, sorting operations, queries, etc.

Microprocessor 90 may perform other pre-processing of incoming analog signals. In some embodiments, microprocessor 90 may run data through alarm and processing filters. Alarm trips (e.g., generated when a value falls outside a predetermined range) and processed values can be reported to the associated communicator 38. In certain embodiments, microprocessor 90 can perform Fast Fourier Transforms (FFT) and generate alarms and further processing that are triggered by threshold values in the resultant FFT spectrum. In some embodiments, microprocessor 90 may run data through other filters, such as, for example, a low pass filter or moving average filter.

A digitized data record for a sensor unit 42, 44, 46 may include a sensor type identifier, a data reporting rate, a data type identifier (e.g., real-time, moving average, filtered data), sensor channel (which identifies which sensor from which the data is derived) and timestamp. In some embodiments, multiple digital signal values may be packaged (e.g., at a respective sensor unit 42, 44, 46 using microprocessor 90) and each packet may further include number of samples in the packet, timestamp of the first data sample in the packet and a sample stream including readings for each active sensor channel. In some implementations, about 100 or more digital signal values, such as about 200 digital signal values may be packaged together for transmission. An exemplary data record or packet structure is provided below:

| Data Record/Packet | |
| --- | --- |
| (2 Bytes) | Sensor Type |
| (2 Bytes) | Data Reporting Rate |
| (2 Bytes) | Data Type Mask |
| (2 Bytes) | A/D Channel Select Mask |
| (4 Bytes) | Timestamp of the First Data Sample |
| (2 Bytes) | Number of Samples in Packet |
| (x Bytes) | Data Samples where x = (Bytes per Data Sample × Number of Samples × Number of A/D Channels × Number of Data Types) |

In this embodiment, multiple digital signal values (i.e., samples) are packaged together for transmission with a single timestamp for the first sample. By including the reporting rate in the packet, the relative timing of each subsequent sample in the packet can be determined by a remote processing unit. While it is possible to include a timestamp for each sample in a packet, doing so would require a larger data file.

Figure 6:
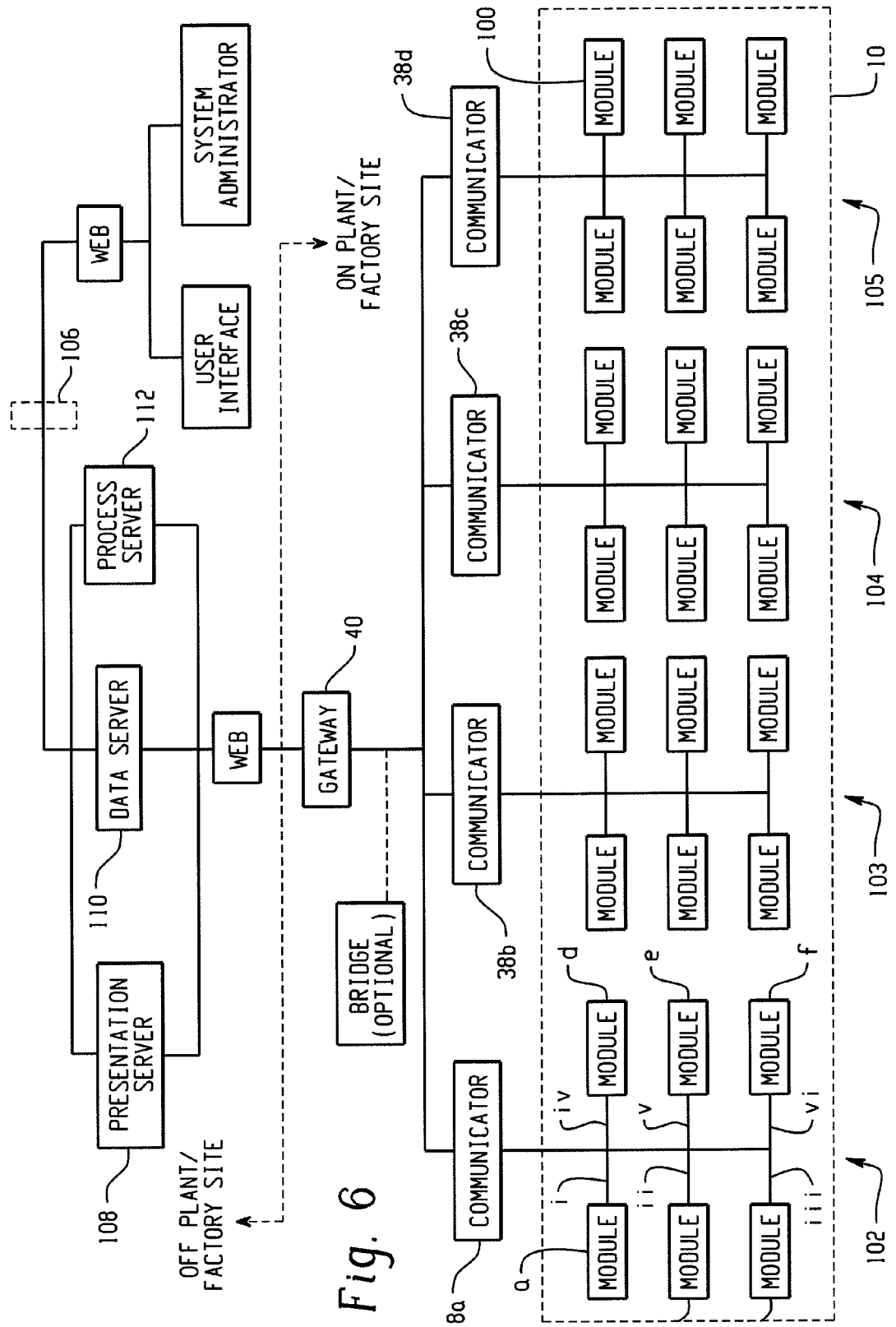
FIG. 6 is an embodiment of a data flow diagram for a monitoring system.

Referring to FIG. 6, an exemplary data flow diagram is shown. Sensor units 42, 44, 46, here collectively referred to as 100 for ease of description, are mounted locally to rolling mill machine 10 (represented by dotted lines). The sensor units 100 are each capable of generating data corresponding to operating conditions of the rolling mill machine, as described above. The sensor units 100 are connected to communicators 38 to allow the sensor units to send pre-processed data to the communicators. While four communicators 38 are shown connected to gateway 40, there may be more communicators such as six communicators or, alternatively, there may be less than four communicators such as two communicators for a given gateway 40.

Communicators 38 can be intermediate devices that provide a bridge and a meta-controller for an associated group 102, 103, 104, 105 of sensor units 100 and gateway 40. Each communicator 38 has six serial communications channels, each channel providing a connection to a respective sensor unit 100. For example, communicator 38a has six serial communications channels i-vi, each channel providing a connection to respective sensor units a-f. Each communications channel is controlled by a dedicated microprocessor, e.g., one microprocessor per channel at the respective communicator 38. The digital data signal values (e.g., in packets) are passed to the gateway 40, for example, every two seconds. In some embodiments, an additional microprocessor may be included at the communicator 38 to control a wireless communications channel for communicating to wireless sensor units (e.g., see sensor units 46a and 46b of FIG. 1). Communicators 38 may further include another microprocessor for controlling a network connection (e.g., LAN connection, IP protocol) with the gateway 40. In some instances, the communicators 38 provide a self-healing direct current power to each associated sensor unit 100 and can discontinue communications through a selected channel while allowing communications through the remaining channels.

In some embodiments, monitoring system 12 includes independent, current-limited voltage regulators on one or more channel connections. The regulators can be monitored and controlled by the dedicated channel microprocessors to provide self-healing in that a channel power supply can identify and recover from wiring and/or sensor electrical failure. As an example, in an instance where sensor power is shorted to ground, the current limiting regulator can fold the sensor supply voltage back to prevent immediate damage. The channel microprocessor can detect that the channel voltage is at an abnormal level and can discontinue power to the malfunctioning sensor and issue a fault message. In some embodiments, the channel microprocessor can periodically retry applying sensor power to detect normal operation.

Gateway 40 can be a server or personal computer (e.g., an Intel® based computer having a Linux operating system with open source and software tools). In some embodiments, the gateway 40 includes multiple network cards, for example, one for connections to the communicators 38 and another for providing access to a user network and the Internet. In certain embodiments, there may be more than one gateway 40. In some of these embodiments including multiple gateways 40, one gateway can serve as a master and handle all Internet communications.

Gateway 40 is connected to the communicators 38 and receives and adds a date/time value, e.g., accurate to a second to the timestamps generated by the sensor units and a communicator identifier. The date and time value added by the gateway 40 and the timestamp generated at each sensor unit 100 is used as an identifier for each data record value packet. In some embodiments, the gateway performs additional processing of the data received such as alarm processing and processing that involves data from more than one sensor unit 100 or module A/D channel, as examples. The gateway 40 can store data for a period of time in memory and send the data (and associated alarm information and other processing results) to a group of servers, e.g., a presentation server 108, a data server 110 and/or a process server 112 continuously.

The combination of the sensor unit 100 hardware timestamp and the date/time value added by the gateway 40 server can be used to pinpoint each data record sample in time. A UDP protocol can be used to communicate between the gateway 40 and the communicators 38. The UDP protocol may require less data overhead, for example, compared to a fully synchronous protocol like TCP and allows for reservation of bandwidth for data. Because UDP is asynchronous, packets may be received by the gateway out of order. The hardware timestamp and the date/time value combination allows for rebuilding of a data packet stream in time in the system, for example, regardless of how the packets came in.

Gateway 40 can communicate with the presentation server 108, data server 110 and process server 112 using any suitable manner. In some embodiments, the communication between the gateway 40 and servers 108, 110 and 112 is achieved using HTTP protocol and TCP/IP. The gateway 40 provides diagnostic tools to monitor the health of the rolling mill machine 10 and can notify a user of alarms and processing results via e-mail, phone, pager and other communication devices.

Servers 108, 110 and 112 can be of any suitable configurations, such as Intel® based having a Linux operating system with open source and software tools. Presentation server 108 is located remote from the motor room portion 32 (FIG. 1) and can provide a central communications point for all the servers. The presentation server 108 collects data from all the gateways (i.e., gateway 40) and provides a web-based interface 114 to users. Support servers, e.g., the database server 110 and the process server 112 exist within a firewall 106 and include servers and server clusters dedicated to data storage and access, generation of graphics and data processing for analysis purposes.

Synchronization of data samples in a packet is performed by the data server 110 using the timestamp value of the first data sample, the packet size, data reporting rate and number of A/D channels. This information is used to calculate the timestamp for each individual data sample, for example, during a dwdata process on the database server, which reads data samples collected by the presentation server 108 from the gateway(s) 40 and splits up the data packets and stores the data samples as individual rows in one or more database table.

Data samples may be synchronized upon user command, for example, for display in reports and graphs and/or for use in post analysis such as for creating Fast Fourier Transforms of vibration data. Data sample packets can be selected using the date/time values that lie in a user-specified range. The data samples of the data sample packets lying in the user specified range can then be sorted by the timestamps, as described above.

Sorting the data samples by their timestamps, whether assigned at the sensor unit for example to the first data sample of the packet, or whether calculated by the data server 110 as described above will better ensure that data samples are aligned across sensors and in time across the sensors. This alignment of data samples can be important to show operating conditions at a variety of positions across the drive train, for example, as vibrations travel through the drive train. In some embodiments, data samples originating from about 100 sensors or more, such as 420 sensors or more can be synchronized using timestamps, for example, by setting all sensors to a timestamp of 0 at substantially the same time (i.e., within an acceptable error band of ½ a millisecond of one another).

Components of the monitoring system 12 including the sensor units 100 are reconfigurable automatically and/or by user command. In some embodiments, data acquisition and data reporting of the sensor unit 100 is configurable by commands sent to the sensor unit from the gateway 40 and/or the communicator 38 over the serial communications link therebetween. Reporting of data from the sensor unit 100 to the communicator 38 is configurable with parameters such as reporting rate, data type, and A/D channels to be reported. In some implementations, reporting rates are automatically changed based on, for example, measured rotational speed of a given data location of a component. Such reconfiguration is achieved through locating microprocessor 90 in the sensor unit 100, as described above, which provides each sensor unit with a capability to process incoming data locally. In some instances, operating software for the microprocessors in the sensor units 100 and the sensor units 38 can be reprogrammed remotely, which can be used to upgrade installed components of the monitoring system 12, for example, from a central location via the Internet.

Gateway 40 includes software that runs various processes including dwconfig, dwmonitor and dwsend. Dwconfig retrieves pending commands from the servers 108, 110 and 112 and queues the commands for dwmonitor. Dwmonitor passes the commands to the communicator/sensor unit network, receives data and stores data in memory (e.g., at a local database). Alarm and processing applications can be attached to the dwmonitor process at system startup and during operation in response to commands received from the gateway 40. Dwsend retrieves stored data and sends the data to the servers 108, 110 and 112. Presentation server 108 includes a web service that receives data from the gateway 40 and stores the data in a table at a staging database. Database server 110 runs the dwdata process that takes data from the staging database and spreads the data across a series of databases and database tables. Each sensor unit 100 may have a respective series of tables stored in a database and each sensor unit 100 A/D channel may have a respective table in the series of tables. Process server 112 runs a web service, e.g., that can generate graphs and can provide processed data on demand for the presentation server 108.

Monitoring system 12 may include a number of software tools and applications that can be utilized in analyzing machine operating conditions. In one embodiment, monitoring system 12 includes case-based reasoning (CBR), which is an artificial intelligence technique that mimics how the human mind stores experimental knowledge. Situations are characterized as a series of parameters called cases. New cases are created on demand and characterized by often incomplete parameter sets. A nearest-neighbor algorithm selects cases from the database that resemble the parameter sets of the new cases and are used to provide direction on how to react to or further process new cases. CBR can be used to mimic basic experimental knowledge of vibration and maintenance personnel.

Figure 7:
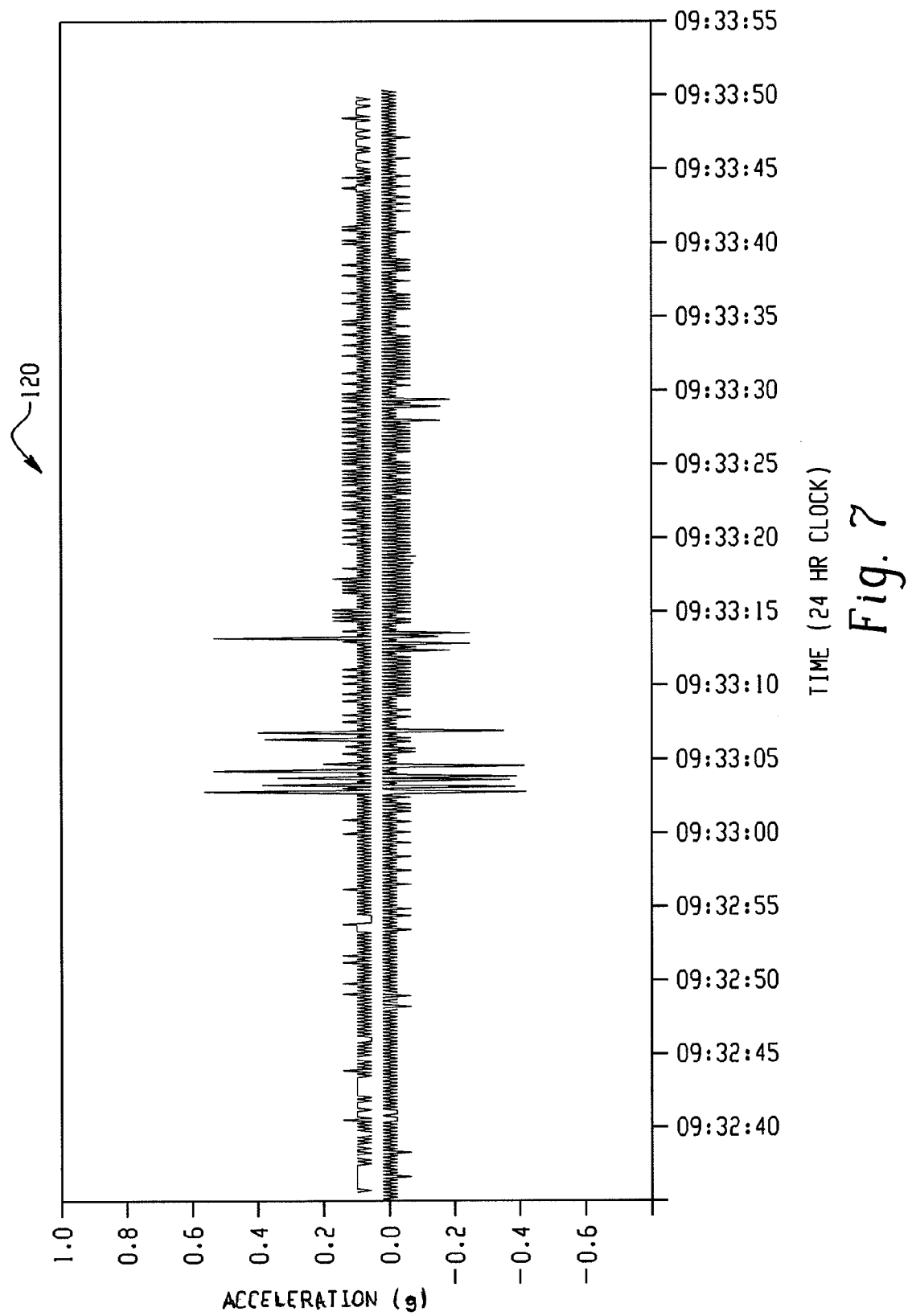
FIG. 7 is an embodiment of a record.

FIG. 7 shows an exemplary report 120 showing vibration values measured using monitoring system 12. Report 120 can be accessed, for example, remotely via a user interface such as a personal computer capable of communication with the servers 108, 110 and 112 as described above.

The above-described monitoring system 12 can provide an intelligent data acquisition network. This is accomplished, in part, by locating microprocessors 90 at the sensor units 100 that are capable of receiving and carrying out a variety of data acquisition commands. The monitoring system 12 can be setup for a variety of different data acquisition modes. In one embodiment, the monitoring system 12 may include a routine mode and an analysis mode. In the routine mode, the monitoring system 12 can acquire data in a predetermined, consistent and repeatable fashion to provide trending analysis. If a potential problem is detected (e.g., by the monitoring system 12 and/or by a user, for example, remotely), the analysis mode may be initiated to provide data acquisition for detailed diagnostic purposes. The date/time value added by the gateway 40 can be accurate to one second. The sensor unit applied timestamp can be accurate to 0.000125 seconds. That can allow the monitoring system 12 to maintain synchronization of data samples at reporting rates of up to about 8000 Hz. The monitoring system's architecture can be adaptable to a variety of protocols to accommodate other existing, in-house monitoring systems and can be added to an existing equipment monitoring system. Monitoring system 12 software may contain analysis capabilities for drive train diagnostics. Component geography and specification information can be included which can provide a detailed and accurate assessment of operating conditions.

Figure 8:
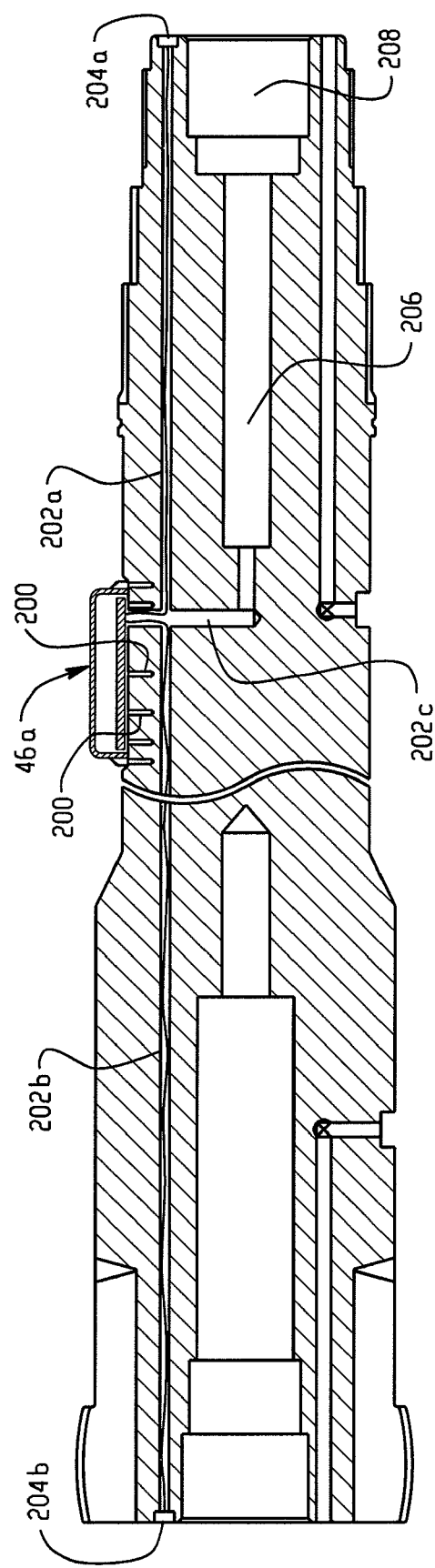
FIG. 8 is an embodiment of a coupling shaft adapted for use with a wireless sensor unit.

Referring now to FIG. 8, an embodiment of a drive shaft adapted for use with wireless sensor units 46*a* and 46*b*. Specifically, a wireless sensor unit 46*a* is mounted at the exterior of the shaft and may be held thereto by fasteners 200. Multiple wiring paths 202*a*, 202*b* and 202*c* are provided internal of the shaft. Wiring paths 202*a* and 202*b* carry wiring from the sensor unit electronics to sensors 204a and 204b located toward the ends of the shaft. Wiring path 202c extends from the sensor unit location to a battery pack space 206 located internal of the shaft, the space preferably centered on the axis of the shaft. Access to the battery pack space is via open end 208 of the shaft to enable installation, removal and replacement of battery packs as necessary. In one example the battery pack is formed by a cylindrical shell having multiple "standard" batteries loaded therein and connected in series, with a filler material located in the space between the batteries and an end cap with positive and negative terminals that connected to the wiring running from the sensor unit 46a.

As explained above, sensor units 46a and 46b may be adapted for wireless communication with the communicator 38c in view of the rotation of such sensor units with the coupling shaft. Various modes, in addition to those described above, can be implemented in such sensor units.

In one example, the sensor units 46a and 46b can include a listening mode. Once the sensor unit is powered up, the unit may automatically default to the listening mode. In this mode the unit is able to be "called" by a radio partner (e.g., Bluetooth protocol from the communicator 38c) in order to execute set commands issued by the communicator. The listening mode operation draws relatively low power consumption compared to the transmission mode (e.g., when the unit is transmitting data to the communicator). This mode enables the unit to be activated at strategic times to initiate data acquisition during events of interest. For example, data acquisition might be triggered when another part of the system identifies an increase in operating speed of the drive system, which typically occurs when the drive is being ramped up from an idle mode to a speed suitable for functional operation. In this manner, the system will more reliably obtain data during critical time periods of drive operation. Moreover, by triggering the activation mode of sensor units (be they wireless or wired) the system assures that all sensor units are acquiring data at during the critical time periods. In addition, in the listening mode, the sensor unit can also receive changes in configuration settings such as A/D activation, data reporting rates, data type and filter settings.

As mentioned above, while in the listening mode, the sensor unit can be given commands to transition it from listening to another operation mode such as acquisition mode. In this mode the sensor unit performs data acquisition functions. The acquisition mode is "scheduled" in a command that includes start time and stop time. As an example, the sensor unit can be given a data acquisition command that would include; start data acquisition in 10 seconds and acquire data for 60 seconds. The start time and stop time can be varied in an unlimited fashion. The data that is acquired is instantly stored in the onboard memory of the unit itself. The data remains in the unit's memory indefinitely until retrieved via the transmission mode. Data may be stored as first-in-first-out. The memory is upgradeable as technology improves. The acquisition mode can be "triggered" by an external event or setup as an internal routine that is activated at system start up.

In order to off-load data or receive configuration responses, the unit goes into transmission mode to transmit data to the host radio installed in the communicator. In the case of data transmission, a request can be made by the communicator to transmit all or only portions of the data stored in memory. Data may be stored in memory based on time and specific data "time slices" can be requested. Once the data is transmitted, the host conducts a reconciliation procedure to insure that the host received the data requested. Once confirmed, the host will then issue a "mark data" command which instructs the sensor unit to mark data in memory which then allows that data to be cleared from memory. This provision insures that wireless data transmission is successful. The transmission mode will consume the most power, and therefore it is desirable to perform this operation as efficiently and reliably as possibly.

In a system such as that shown in FIG. 1, implementation of the listening mode, acquisition mode and transmission mode on a controlled basis via commands from the communicator enables a store and forward type of data process that eliminates interfering communications between the two sensor units 46a and 46b and the communicator 38c. In other words, the communicator can trigger each sensor unit to transmit data on a one at a time basis in order to avoid both sensor units attempting to transmit data simultaneously to the communicator, which could occur if the two sensor units 46a and 46b were configured to simply transmit data automatically without being triggered by the communicator.

The sensor units 46a and 46b may also be configured to include an alarm monitor feature during the data acquisition mode. Specifically, during a normal acquisition mode as described above the acquired data is automatically stored in on-board memory for later transmission to the communicator. Inclusion or activation of the alarm feature would result in the sensor unit monitoring the acquired data for an alarm condition and, upon identification of the alarm condition, automatically transmitting to the communicator a notification of the alarm condition and/or specific details regarding the nature of the alarm condition. The parameters for an alarm condition may include items such as A/D channel, threshold, alarm if over or alarm if under, and duration. The sensor unit may also run in a alarm only data acquisition mode where it will only send messages to the communicator when an alarm condition is detected.

The on-board processor of the sensor units will typically include multiple A/D channels for connection to multiple respective sensors. In this regard, the sensor unit may be configured with an A/D channel mask feature when in the data acquisition mode. Specifically, the sensor unit may to store and/or report data at multiple different rates across its various A/D channels (this feature may also be included into wired sensor units). The sensor unit may include two report rates and two sets of A/D channel masks, one for each report rate. The A/D sampling and data packing routines are configured to support these two separate report rates. The data for each report rate will be kept in its own buffer on the sensor unit. When the buffer is 'full', the data will either be shipped out via radio transmission if in live mode or stored on the external RAM if in store and forward mode. The header information for the data packet will be similar to that described above, informing the Gateway of the starting timestamp for the data, the A/D channels involved in the data, the sample rate, the report rate and the data mask.

The sensor units 46a and 46b may include a download-over-the-air (DOTA) feature to that wireless downloading or firmware upgrading is performed successfully. The DOTA feature may implemented by incorporating a hardware device such as a credit card size PCB assembly that plugs into an ISP header of the main board. The DOTA card would include an on-board processor and a serial data flash to provide storage to contain required programming, control and backup data. On reset, the main processor of the sensor unit sends version information to the DOTA card. If the software version on the DOTA card is newer, to DOTA card would reset the main processor and bootload it from the file located on the DOTA card. If new application data is wirelessly sent to the sensor unit, the main processor's application code would redirect the data to DOTA card via signals over the ISP connector. Once a complete file is downloaded and validated, the existing application file could be stored as back-up and the new application file can be bootloaded to the main processor. If the sensor unit receives a "rollback" command the DOTA card could bootload the older, backup version of the application file to the main processor. If the sensor unit is unable to communicate with the communicator for some time period after a bootload, the main processor may be configured to directly request a "rollback" from the DOTA card.

To facilitate the DOTA function and as well as download upgrades for wires sensor units, a bootload-over-ethernet (BOE) function may be incorporated into the monitoring system. If new application data is sent to the communicator, the data is routed and stored on an SD-Card located in an SD-Socket of the communicator. Once a complete file is downloaded and validated, the current application file is copied to back-up and the new file becomes the "active" application file. Interlocks may be used to prevent partial loads and make sure that all application data is downloaded, in total, before allowing it to be used as an update file. At any time a "rollback" command can be sent to the communicator causing the communicator to make the back-up application file the new "active" application file for rebootloading purposes.

As mentioned above with reference to FIG. 7, data that is acquired and stored by the monitoring system can be made available, for example, remotely via a user interface such as a personal computer capable of communication with the servers 108, 110 and 112. By way of example, an owner of the drive system being monitored may be given access to reports and data via a secure web site that associates specific drive systems with specific users (e.g., as by user id and password). Thus when a user logs in the user may be presented with an interface listing the various monitored drive systems associated with that user. A user may select to view information about a given drive system by clicking on that drive system listing (e.g., the drive system listing includes a link to another page that provides information about that drive system. In one implementation, the user may be presented with a web page showing a schematic or drawing of the configuration of the drive system as shown by example in FIG. 9. The schematic of FIG. 9 corresponds to a drive system comparable to that shown in FIG. 1. The user may then select a component of the drive system for which he/she wishes to see further data (e.g., the depiction of certain components may be set up as links).

Figure 9:
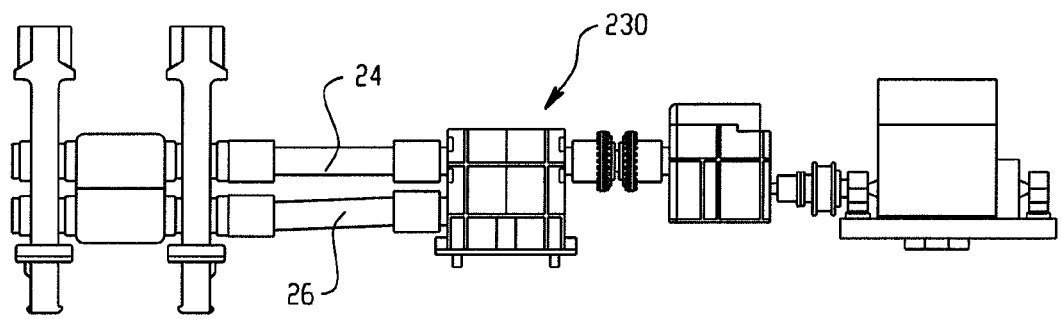
FIGS. 9-13 are embodiments interfaces presented to a user seeking data regarding a monitored drive system.
Figure 10:
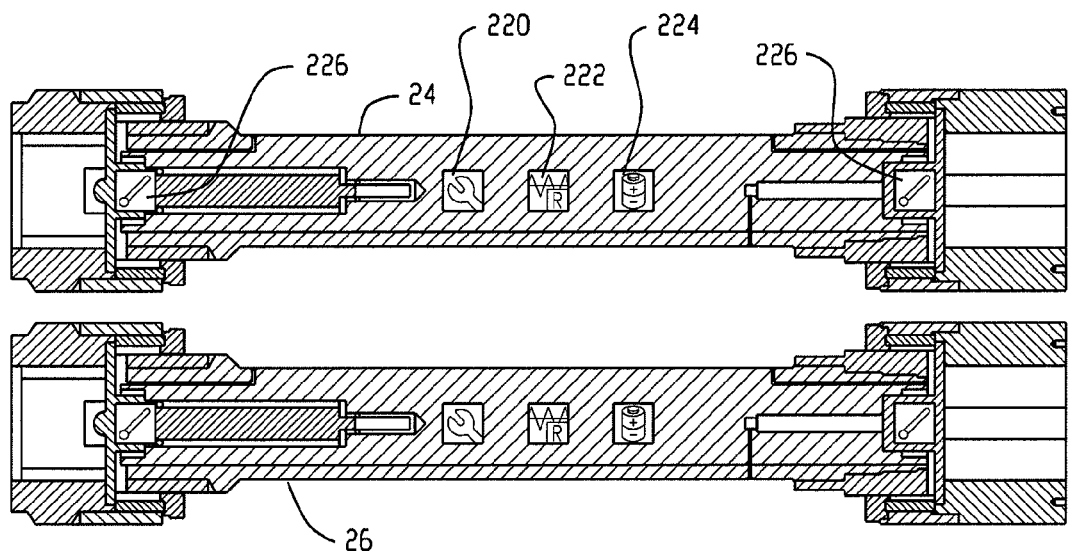
Figure 11:
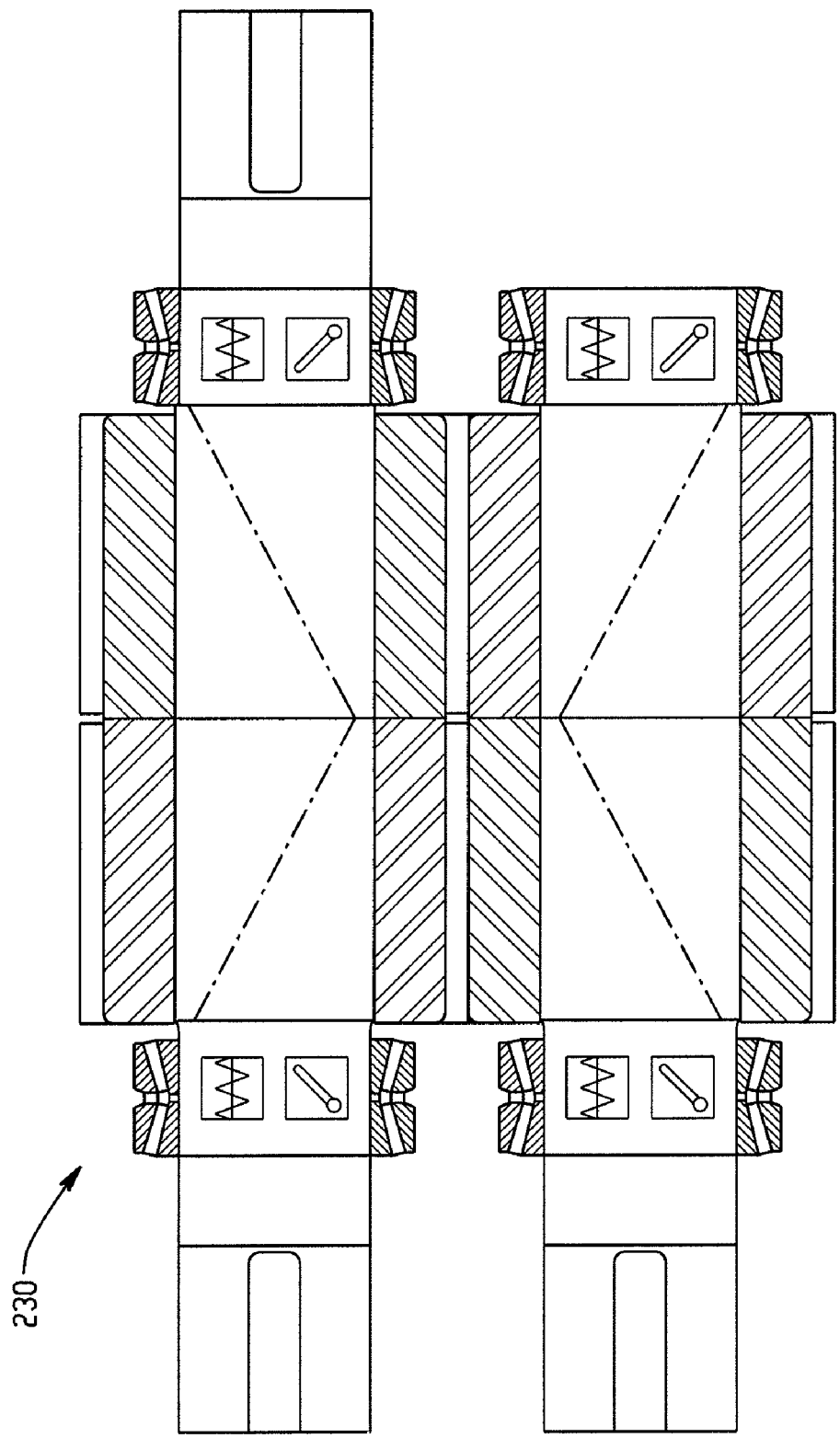

FIG. 10 represents the next interface screen that might be presented to a user that selects the coupling shafts shown in FIG. 9. The schematic of FIG. 10 shows the individual drive component, along with visual icons reflecting the type of data that are available for the component. By way of example, FIG. 10 includes icons 220, 222, 224 and 226 representing torque strain, vibration, battery power and temperature respectively. Each of these icons may also act as a link enabling a user to drill down further and obtain more detailed data. FIG. 11 shows an example of a schematic presented to a user that selects the pinion stand of FIG. 9.

Figure 12:
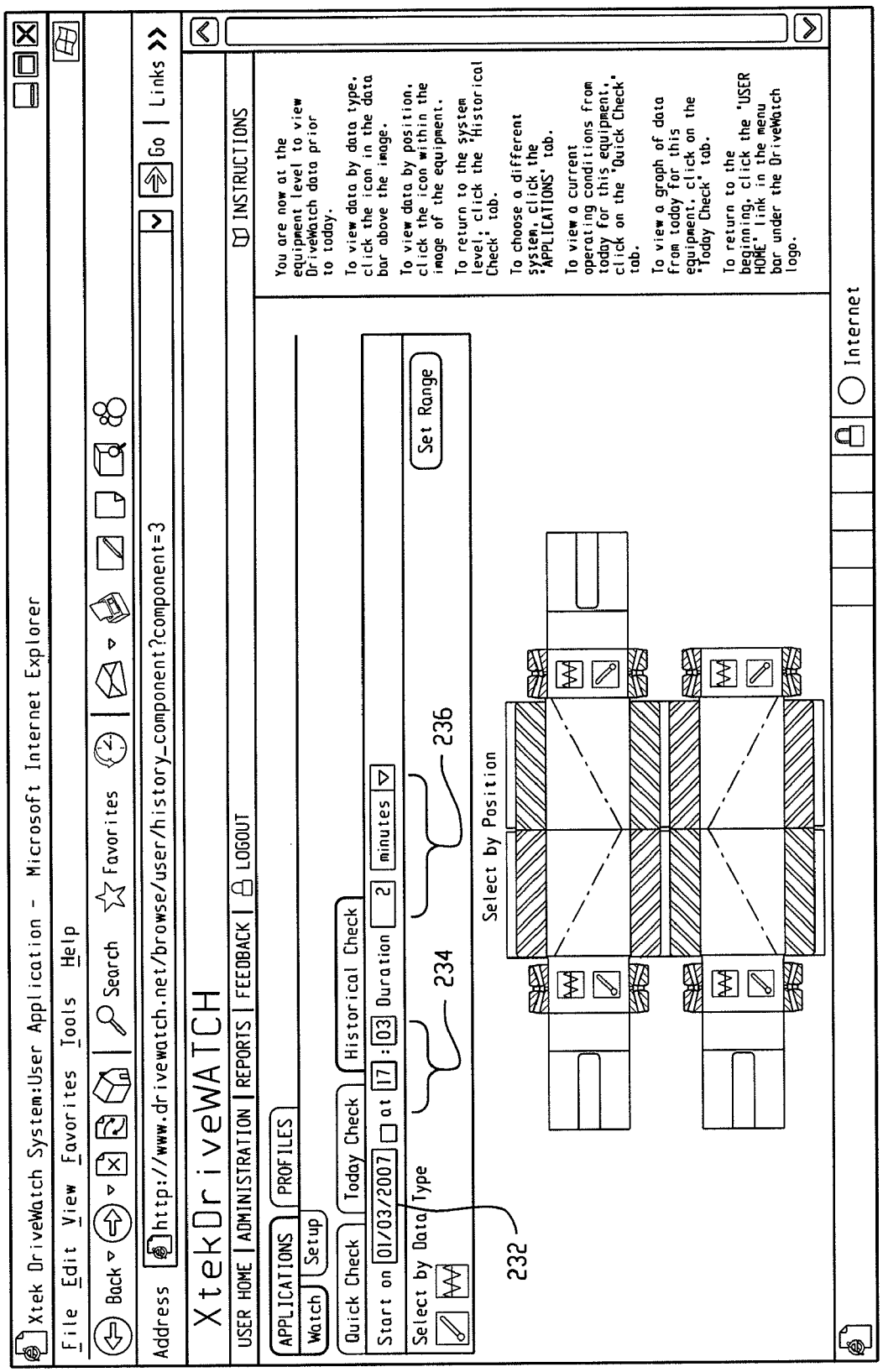
Figure 13:
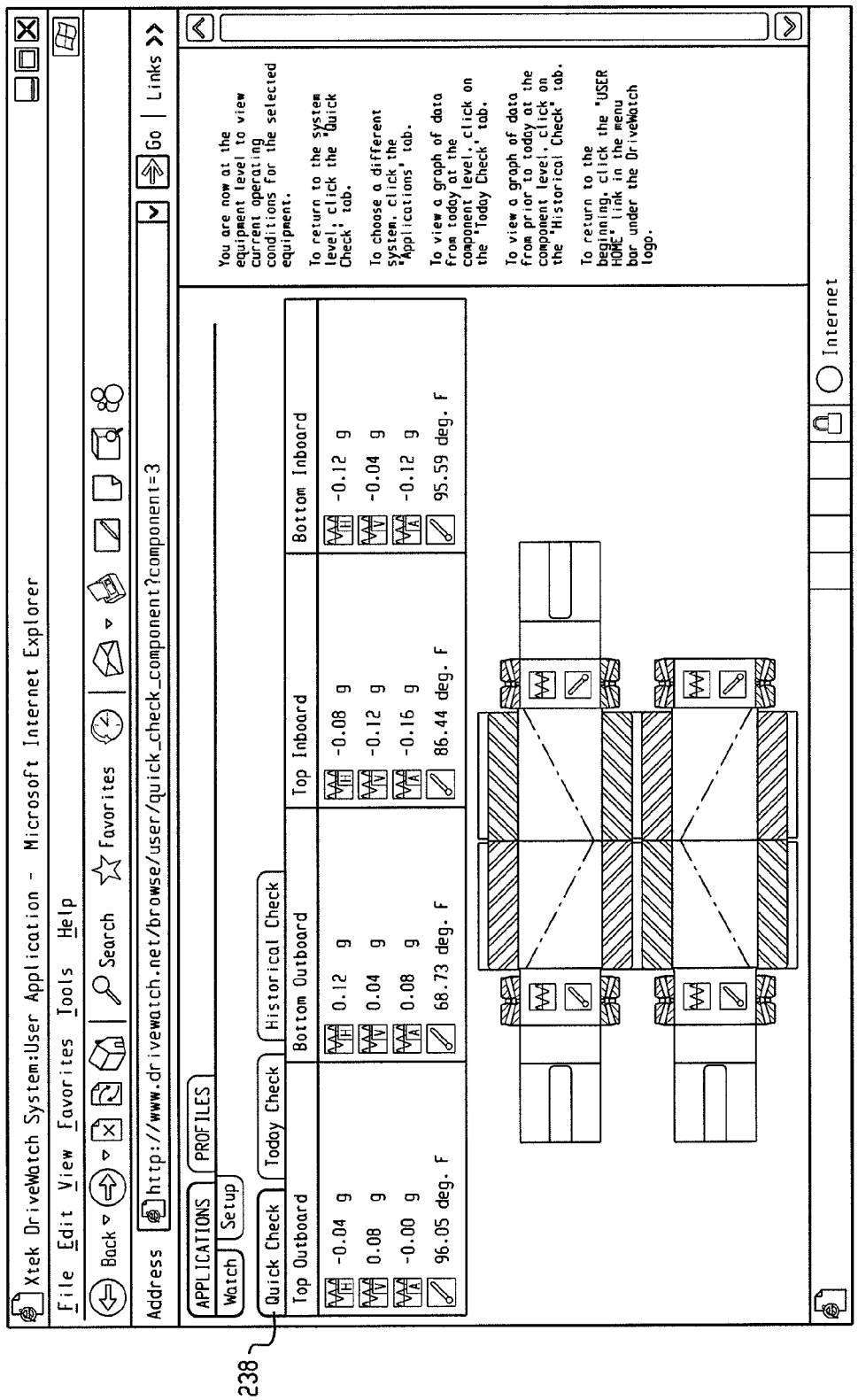

The interface presented to the user may also enable the user to specify a timeframe of interest. By way of example, referring to FIG. 12, the interface may enable a user to specify a start date 232, start time 234 and duration 236 of interest The system responsively collects and presents data from the specified time frame. This feature enables a user to look at short time periods, long time periods, recent data of older data at will, making the system more useful. The interface may also provide a "quick check" option 238 that provides current data for the component in question as shown in FIG. 13. This option shows most recent or "near instantaneous" data on the monitored drive system.

A number of detailed embodiments have been described. Nevertheless, it will be understood that various modifications may be made. Accordingly, other embodiments are within the scope of the following claims.

What is claimed is:

1. A method of tracking operational parameters of a drive system including first and second members driven respectively by first and second coupling shafts, the method comprising:

providing a first sensor unit on the first coupling shaft, the first sensor unit adapted for wireless communication with a remote processing unit, the first sensor unit including an integrated local processor and local memory;

providing a second sensor unit on the second coupling shaft, the second sensor unit adapted for wireless communication with the remote processing unit, the second sensor unit including an integrated local processor and local memory;

the first sensor unit operating to acquire and store sensor data in its local memory until the first sensor unit receives a data transmit trigger from the remote processing unit;

the second sensor unit operating to acquire and store sensor data in its local memory until the second sensor unit receives a data transmit trigger from the remote processing unit;

sending a transmit trigger wirelessly from the remote processing unit to the first sensor unit, the first sensor unit responsively wirelessly transmits sensor data to the remote processing unit;

sending a transmit trigger wirelessly from the remote processing unit to the second sensor unit, the second sensor unit responsively wirelessly transmits sensor data to the remote processing unit;

wherein the sending of the transmit trigger to the second sensor unit is offset in time from the sending of the transmit trigger to the first sensor unit so as to assure that transmission of sensor data from the first sensor unit to the remote processing unit is completed before transmission of sensor data from the second sensor unit to the remote processing unit takes place.

2. The method of claim 1 wherein the remote processing unit is located spaced apart from, but in a common facility with the first sensor unit and the second sensor unit.

3. The method of claim 1 wherein the first sensor unit operates with an alarm monitor feature active, wherein the first sensor unit monitors acquired sensor data for at least one defined alarm conditions and, if the defined alarm condition is detected the first sensor unit automatically initiates a wireless transmission of an alarm indication to the remote processing unit.

4. A method of tracking operational parameters of a drive system, the method comprising:

providing a first sensor unit on a first component of the drive system, the first sensor unit including an integrated local processor;

providing a second sensor unit on a second component of the drive system, the second sensor unit including an integrated local processor;

detecting a working condition of the drive system;

responsive to detection of the working condition, sending a data acquire instruction to the first sensor unit; and sending a data acquire instruction to the second sensor unit, causing both the first and second sensor units to acquire sensor data during a common time period that overlaps with the drive system operating in the working condition.

5. The method of claim 4 wherein the working condition is a speed condition of the drive system.

6. The method of claim 5 wherein the working condition is detected by detecting an increase in speed.

7. A data acquisition system for tracking operational parameters of a drive system, the data acquisition system comprising: a first sensor unit mounted on a rotating component of the drive system, the first sensor unit including an integrated processor and means for wireless communication with a processing unit that is spaced from the first sensor unit, the first sensor unit configured to operate in each of (i) a listening mode during which the first sensor unit awaits instruction from the processing unit, (ii) a data acquisition mode triggered by receipt of a data acquire instruction from the processing unit and during which the first sensor unit acquires sensor data and stores the sensor data in on-board memory and (iii) a data transmit mode triggered by receipt of a data transmits instruction from the processing unit and during which the first sensor unit wirelessly transmits stored sensor data from on-board memory to the processing unit.

8. The data acquisition system of claim 7 wherein the data acquisition mode includes an alarm feature by which the first sensor unit monitors acquired sensor data for one or more alarm conditions and, if an alarm condition is identified, the first sensor unit automatically communicates an alarm notification to the processing unit via wireless transmission.

9. The data acquisition system of claim 7 wherein the processing unit monitors a speed of the drive system and wirelessly transmits the data acquire instruction to the first sensor unit when the speed reaches a certain level.

* * * * *

UNITED STATES PATENT AND TRADEMARK OFFICE
CERTIFICATE OF CORRECTION

PATENT NO.        : 7,398,186 B2                                       Page 1 of 1
APPLICATION NO.   : 11/622852
DATED             : July 8, 2008
INVENTOR(S)       : Jeffrey L. Wiles et al.

It is certified that error appears in the above-identified patent and that said Letters Patent is hereby corrected as shown below:

Claim 7, Col. 16, Line 4

"transmits" should be --transmit--

Signed and Sealed this

Eleventh Day of November, 2008

JON W. DUDAS
*Director of the United States Patent and Trademark Office*